(12) United States Patent
Johnston et al.

(10) Patent No.: US 7,714,293 B2
(45) Date of Patent: May 11, 2010

(54) METHODS AND APPARATUS FOR KEYSTONE EFFECT

(75) Inventors: Brian Donald Johnston, Oconomowoc, WI (US); Baojun Li, Waukesha, WI (US)

(73) Assignee: General Electric Company, Schenectady, NY (US)

(*) Notice: Subject to any disclaimer, the term of this patent is extended or adjusted under 35 U.S.C. 154(b) by 288 days.

(21) Appl. No.: 11/620,667

(22) Filed: Jan. 6, 2007

(65) Prior Publication Data

US 2008/0164419 A1 Jul. 10, 2008

(51) Int. Cl.
*H01L 27/146* (2006.01)
(52) U.S. Cl. .............. 250/370.09; 382/132; 378/147; 378/153
(58) Field of Classification Search ............ 250/370.09; 382/132; 378/147, 153
See application file for complete search history.

(56) References Cited

U.S. PATENT DOCUMENTS

| 4,196,351 A | 4/1980 | Albert |
| 4,239,971 A | 12/1980 | Cushman |
| 5,237,599 A * | 8/1993 | Gunji et al. ................. 378/148 |
| 5,572,567 A | 11/1996 | Khutoryansky et al. |
| 5,734,694 A | 3/1998 | Khutoryansky et al. |
| 5,936,247 A * | 8/1999 | Lange et al. ........... 250/363.03 |
| 6,381,302 B1 * | 4/2002 | Berestov ..................... 378/41 |
| 6,730,924 B1 * | 5/2004 | Pastyr et al. ............. 250/505.1 |
| 6,850,596 B2 * | 2/2005 | Sundermann et al. ....... 378/147 |
| 7,440,550 B2 * | 10/2008 | Xu ............................ 378/147 |
| 2002/0131556 A1 * | 9/2002 | Steinberg .................... 378/152 |
| 2007/0242806 A1 * | 10/2007 | Borgmann et al. .......... 378/207 |
| 2008/0008372 A1 * | 1/2008 | Li et al. ..................... 382/131 |
| 2008/0130976 A1 * | 6/2008 | Wang ........................ 382/132 |

FOREIGN PATENT DOCUMENTS

WO    WO 2005048846 A1 *  6/2005

* cited by examiner

*Primary Examiner*—David P Porta
*Assistant Examiner*—Jessica L Eley
(74) *Attorney, Agent, or Firm*—ZPS Group, SC

(57) ABSTRACT

A method includes mechanically correcting for a keystone effect on an x-ray detector.

21 Claims, 5 Drawing Sheets

Whout tube angulation, the x-ray beam is fully located in the receptor.

With tube angulation, the x-ray beam shape is trapezoid. To make sure the beam is fully in the center of the receptor, the FOV needs to be reduced.

US 7,714,293 B2

METHODS AND APPARATUS FOR KEYSTONE EFFECT

BACKGROUND OF THE INVENTION

This invention relates generally to imaging methods and apparatus, and more particularly, to methods and apparatus that provide for reduction or elimination of keystone effect.

During an x-ray tomosynthesis exam, the relationship of the x-ray tube to the detector can vary causing tube angulation as described in U.S. Pat. Nos. 5,734,694 and 5,572,567. This tube angulation causes a keystone effect for the projected x-ray field. Typically, mathematical corrections are performed to compensate for the keystone effect. The x-ray field also exhibits a keystone effect whenever the collimator and tube is not perpendicular to the detector.

It would be desirable to, instead of using mathematical corrections to attempt to compensate for the keystone effect, but rather, to eliminate or reduce the keystone effect in the first place.

BRIEF DESCRIPTION OF THE INVENTION

In one aspect, a method includes mechanically correcting for a keystone effect on an x-ray detector.

In another aspect, apparatus includes an x-ray source, an x-ray detector positioned to receive x-rays emitted from the source, and a collimator positioned between the x-ray source and the x-ray detector, the collimator configured to have movable parts that provide for a keystone correction.

In yet another aspect, a computer readable medium is embedded with a program configured to instruct the computer to operate at least one motor to reduce or eliminate a keystone effect.

In yet still another aspect, an imaging system includes an energy source, a detector positioned to receive energy emitted from the source, and a collimator positioned between the source and the detector. The collimator is configured to provide a rectangular FOV that utilizes all of the detector for single and dual energy exposures when the detector is not perpendicular to energy emitted from the source, such that all the collimated energy can be used for diagnosis.

In still yet another aspect, a computer is configured to receive image data from a first detector position acquisition, receive image data from a second detector position acquisition; wherein an x-ray source to detector angle is different between the acquisitions, and combine the received image data, without performing any keystone correction on the data, to generate a single image of an area greater than the size of the detector.

DETAILED DESCRIPTION OF THE INVENTION

There are herein described methods and apparatus useful for imaging systems such as, for example, but not limited to an x-ray system. The apparatus and methods are illustrated with reference to the figures wherein similar numbers indicate the same elements in all figures. Such figures are intended to be illustrative rather than limiting and are included herewith to facilitate explanation of an exemplary embodiment of the apparatus and methods of the invention. Although, described in the setting of an x-ray system, it is contemplated that the benefits of the invention accrue to all diagnostic imaging systems and modalities such as PET, MRI, SPECT, Ultrasound, fused systems such as a CT/PET system, and/or any modality yet to be developed in which keystone effects occur.

Figure 1:
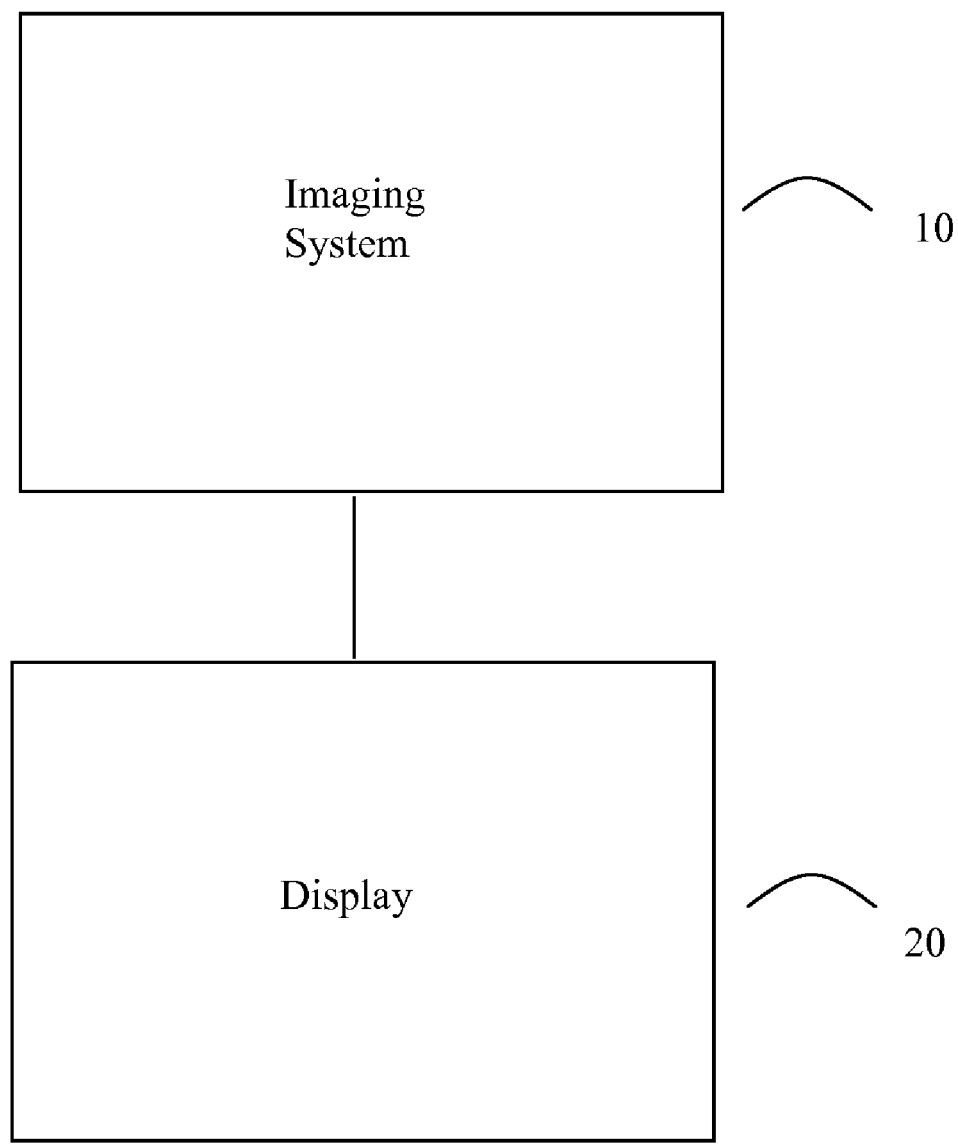
FIG. 1 illustrates an exemplary diagnostic imaging system.

FIG. 1 illustrates an imaging system 10 with an associated display 20. Imaging system 10 can be of any modality, but in one embodiment, system 10 is a CT system. In another embodiment, system 10 is a dual modality imaging system such as a combined CT/PET system and the below described obtainment/attainment of a non-scanner dependent patient specific metric can be done in one modality (e.g., CT) and the processed data can be transferred to the other modality (e.g., PET). Display 20 can be separate from system 10 or integrated with system 10. System 10 includes an acquisition device such as an x-ray radiation detector.

The x-ray imaging system includes a processing circuit. The processing circuit (e.g., a microcontroller, microprocessor, custom ASIC, or the like) is coupled to a memory and a display device. The memory (e.g., including one or more of a floppy disk drive, CD-ROM drive, DVD drive, magnetic optical disk (MOD) device, or any other digital device including a network connecting device such as an Ethernet device for reading instructions and/or data from a computer-readable medium, such as a floppy disk, or an other digital source such as a network or the Internet, as well as yet to be developed digital means, and the like) stores imaging data.

The memory may also store a computer program including instructions executed by the processing circuit to implement the functions described herein. The processing circuit provides an image for display on a device. The detector may be a flat panel solid-state image detector, for example, although conventional film images stored in digital form in the memory may also be processed. In one embodiment, the processing circuit executes instructions stored in firmware (not shown). Oftentimes, a prescription will be for an area larger than the detector, and typically, the imaging is done with moving the detector linearly while pivoting the x-ray source. Therefore, some acquisitions are made at different tube angles. The different data sets from the different acquisitions can be collected in an image pasting system or computer that generates one image of the prescribed area. By using the below described keystone correction, the image data is more readily used by the image pasting processor to generate a single image.

Of course, the methods described herein are not limited to practice in system 10 and can be utilized in connection with many other types and variations of imaging systems. In one embodiment, the processing circuit is a computer that is programmed to perform functions described herein, and, as used herein, the term computer is not limited to just those integrated circuits referred to in the art as computers, but broadly refers to computers, processors, microcontrollers, microcomputers, programmable logic controllers, application specific integrated circuits, and other programmable circuits. Although the herein described methods are described in a human patient setting, it is contemplated that the benefits of the invention accrue to non-human imaging systems such as those systems typically employed in small animal research. Although the herein described methods are described in a medical setting, it is contemplated that the benefits of the invention accrue to non-medical imaging systems such as those systems typically employed in an industrial setting or a transportation setting, such as, for example, but not limited to, a baggage scanning CT system for an airport or other transportation center as shown in FIG. 2.

Figure 2:
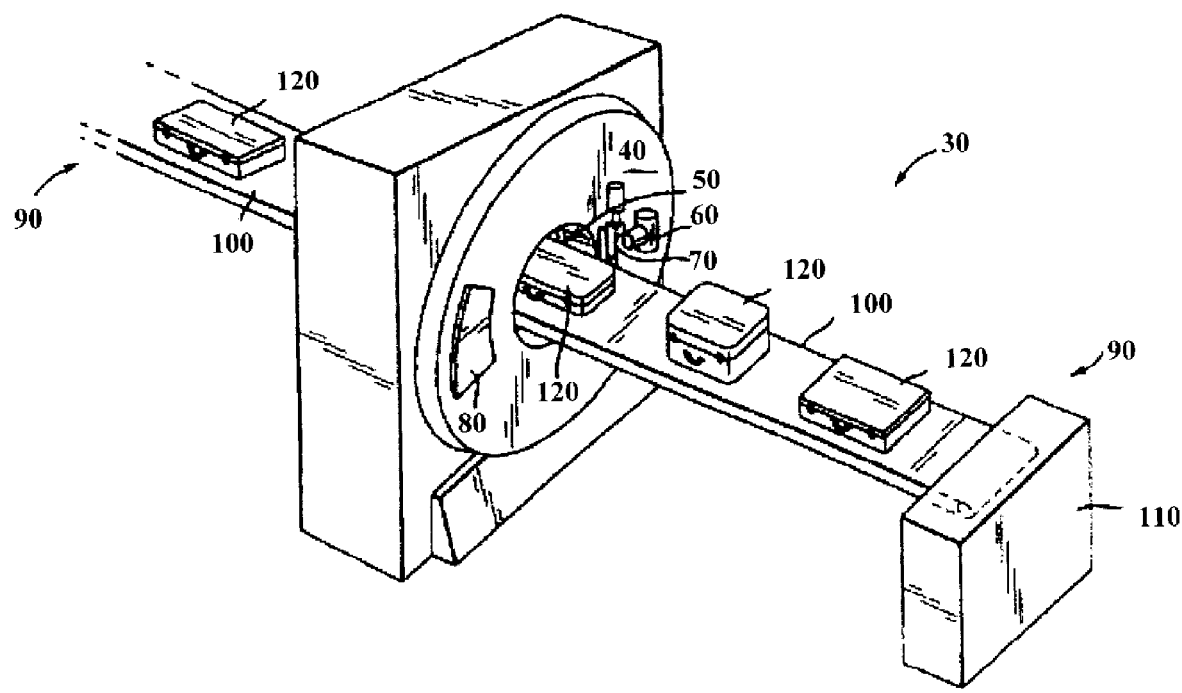
FIG. 2 illustrates a package/baggage inspection system.

Referring now to FIG. 2, a package/baggage inspection system 30 includes a rotatable gantry 40 having an opening 50 therein through which packages or pieces of baggage may pass. The rotatable gantry 50 houses a high frequency electromagnetic energy source 60 aligned with an attenuation filter 70 as well as a detector assembly 80. A conveyor system 90 is also provided and includes a conveyor belt 100 supported by structure 110 to automatically and continuously pass packages or baggage pieces 120 through opening 50 to be scanned. Objects 120 are fed through opening 50 by conveyor belt 100, imaging data is then acquired, and the conveyor belt 100 removes the packages 120 from opening 50 in a controlled and continuous manner. As a result, postal inspectors, baggage handlers, and other security personnel may non-invasively inspect the contents of packages 120 for explosives, knives, guns, contraband, and the like.

Figure 3:
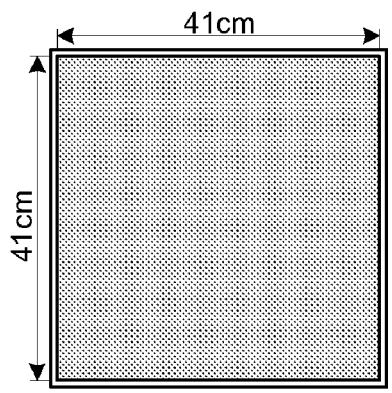
FIG. 3 illustrates a keystone effect.
Figure 3:
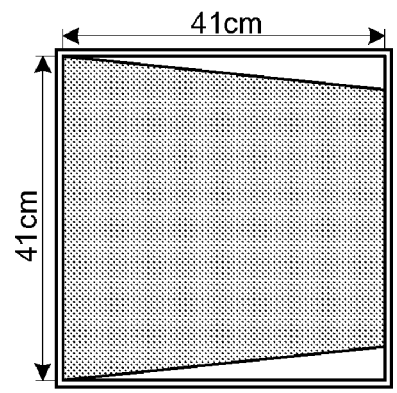

FIG. 3 illustrates a keystone effect. On the left side of FIG. 3, it is shown that without tube angulation, the x-ray beam is fully located in the receptor (detector). On the right side of FIG. 3, one can easily see the x-ray beam shape is trapezoidal due to tube angulation, and that to insure that the beam is fully in the center of the receptor. The field of view (FOV) should be reduced.

Figure 4:
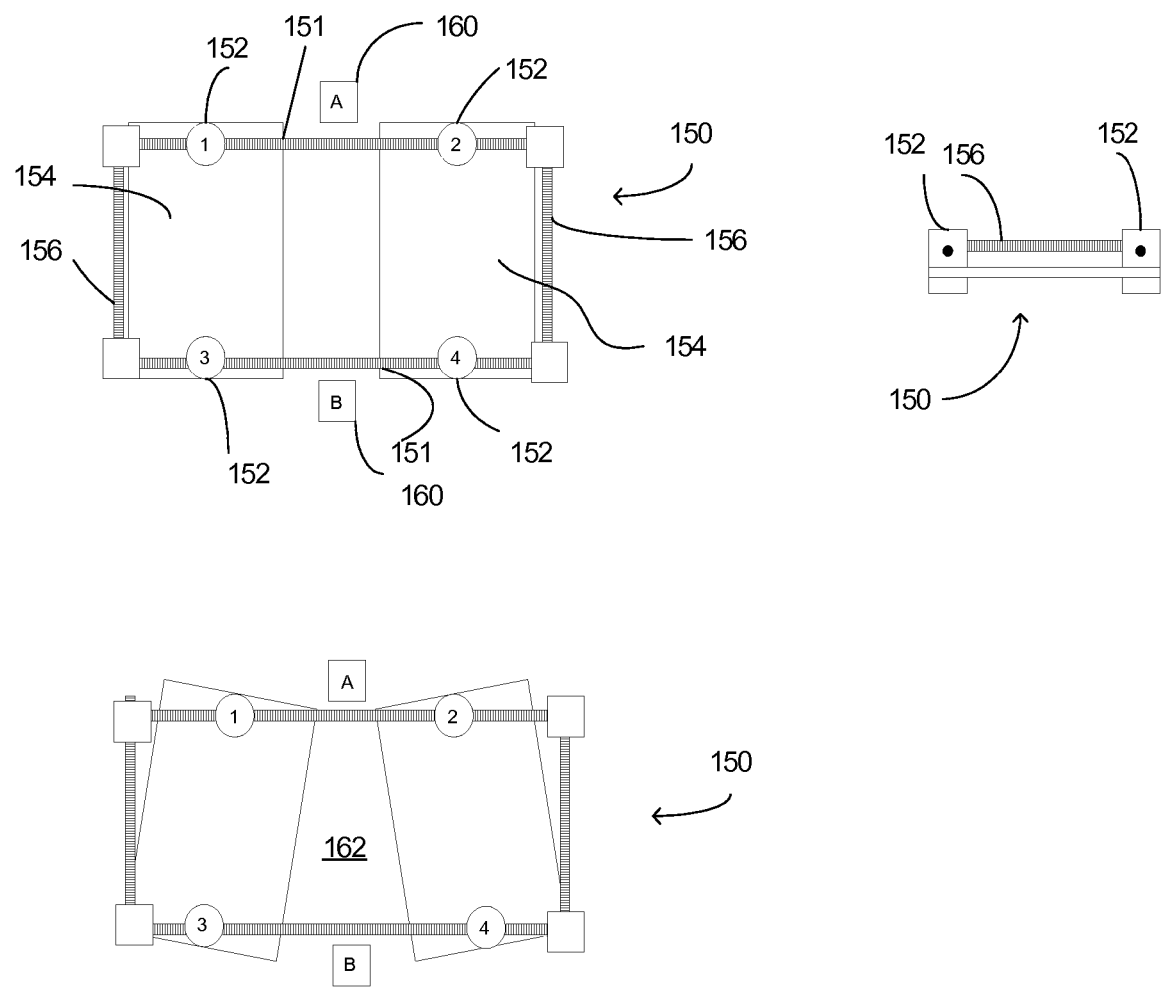
FIG. 4 illustrates one embodiment of a collimation device.

FIG. 4 illustrates a collimation device 150 that utilizes two motors 160 connected to two gears 151 that drive the collimator blades 154 in and out to define the x-ray field of view. The collimator blades are connected to the gears 151 with pivot joints 152. The pivot joints 152 allow the collimator blades 154 to pivot when the two motors 160 are driven at different speeds and driven different distances. For normal operation, the blade edges are parallel when the motors are driven at the same speed and the same distance (as seen in the top part of FIG. 4). For keystone correction, the motors are driven at different speeds and different distances to change the angle between the blades 154 (as seen in the bottom part of FIG. 4). The gears driving the blades motion are connected with compensation joints and gears 156. The compensation gears 156 allow the distance between to drive gears to change when the angle between the blades is adjusted for the keystone correction. This can be applied to both axis of a collimator to allow for keystone correction in both directions. Note that there is a trapezoidal shape 162 formed by the collimation blades 154 being angled, and that the x-rays would go into or out of the page in FIG. 4. Also note that FIG. 4 illustrates using a plurality of compensation gears and joints that utilize a difference in rotation of a pair of collimator gears to adjust a separation of the pair of collimator gears, as seen between the differences between the top and lower portions of FIG. 4 (note the spacing differences between pivot points 152 labeled 1,2,3,4.). Additionally, each motor 160 moves a respective end of the collimator blades 154. For example, motor 160 labeled A moves the top end and motor 160 labeled B moves the bottom end. On the right side of FIG. 4, a side view is illustrated.

Figure 5:
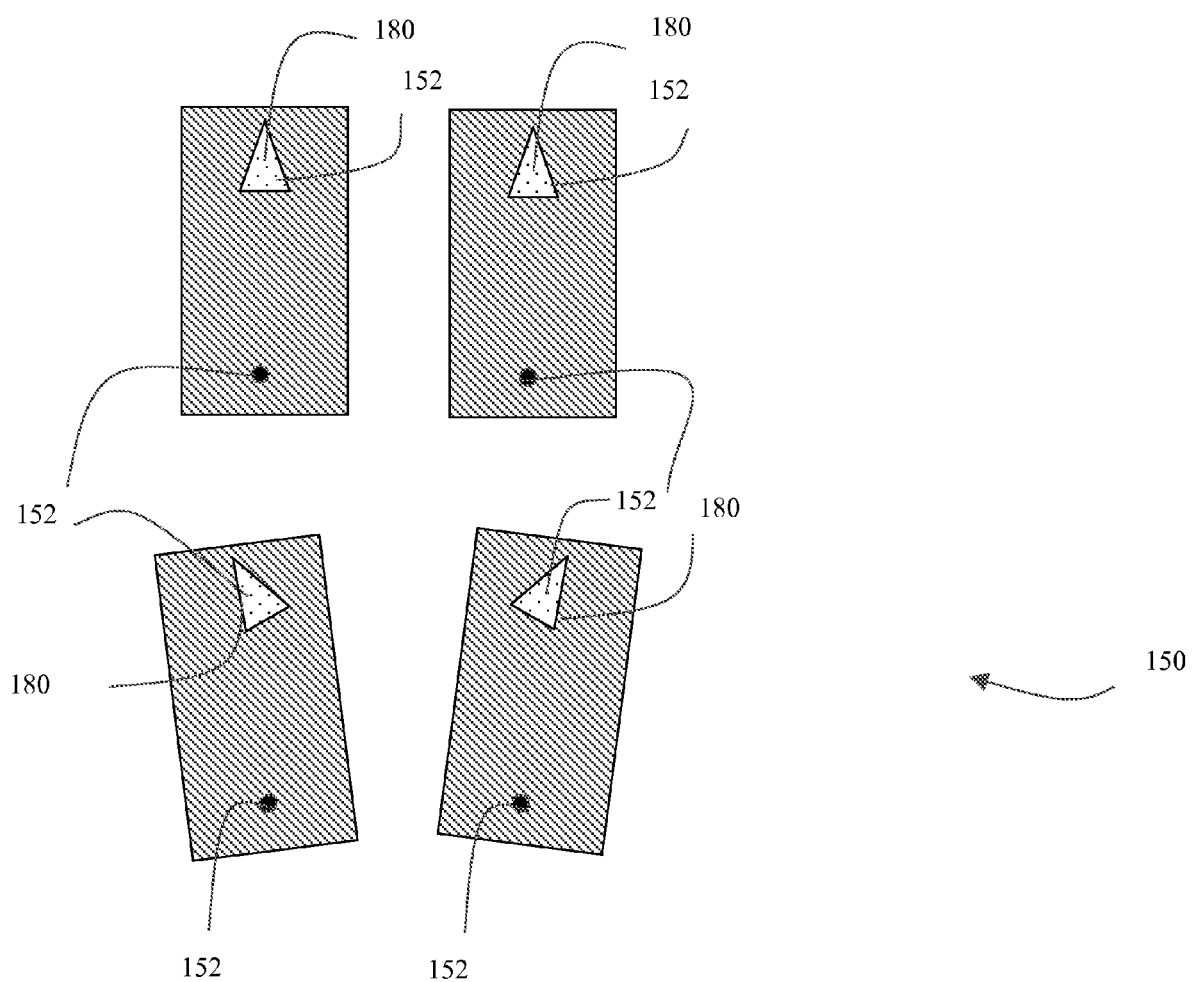
FIG. 5 illustrates another embodiment of a collimation device.

FIG. 5 illustrates another embodiment of collimation device 150, wherein there are a plurality of pivot points 152. Some pivot points 152 are fixed, while other pivot points 152 have cam mechanisms 180 such that they can move and rotate. Then one motor can move the blades in and out, and a second motor can drive off-center cams on one side of the plates. The other side can be fixed pivots as shown in the bottom part of the blades in FIG. 5. It is believed that this would eliminate the need for the compensation gears as described above. The off-center cams on the plates would keep the distance between the driver gears constant. The cam drive would move one side of the plates closer or further apart while the opposite side separation is determined by the drive gears.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Technical effects include an improved dose efficiency for non-perpendicular x-ray exams. By dose efficiency being improved, dose reduction will at least sometimes result. The herein described methods and apparatus provide for easy corrections to improve x-ray dose efficiency during tomosynthesis exams and elimination of image size/shape corrections during subsequent image reconstruction.

Exemplary embodiments are described above in detail. The assemblies and methods are not limited to the specific embodiments described herein, but rather, components of each assembly and/or method may be utilized independently and separately from other components described herein.

While the invention has been described in terms of various specific embodiments, those skilled in the art will recognize that the invention can be practiced with modification within the spirit and scope of the claims.

What is claimed is:

1. An imaging system comprising:
   an energy source;
   a detector positioned to receive energy emitted from the energy source; and
   a collimator positioned between the energy source and the detector, the collimator comprising first and second collimator blades separately positionable to define a field of view (FOV);
   wherein the first and second collimator blades are positionable to form the FOV as a trapezoidal shape.

2. The imaging system of claim 1 comprising a controller configured to:
   adjust a first end of the first collimator blade and a first end of the second collimator blade at a first speed; and
   adjust a second end of the first collimator blade and a second end of the second collimator blade at a second speed that is different from the first speed.

3. The imaging system of claim 1 comprising:
   a first motor coupled to a first end of the first collimator blade, and coupled to a first end of the second collimator blade, wherein the first motor is driveable to form an angle between the first and second collimator blades to form the trapezoidal shape.

4. The imaging system of claim 1 comprising:
   a second motor coupled to a second end of the first collimator blade, and coupled to a second end of the second collimator blade;
   a first gear coupled between the first motor and the first end of each of the first and second collimator blades; and
   a second gear coupled between the second motor and the second end of each of the first and second collimator blades;
   wherein the second motor is driveable to form the angle between the first and second collimator blades to form the trapezoidal shape.

5. The imaging system of claim 3 comprising:
   a first pivot joint coupled to the first end of the first collimator blade; and a second pivot joint coupled to the first end of the second collimator blade;

wherein the first motor is driveable to pivot each of the first and second collimator blades about their respective pivot points to form the angle between the first and second collimator blades to form the trapezoidal shape.

6. The imaging system of claim 1 wherein the first and second collimator blades are positionable to provide a rectangular FOV that utilizes all of the detector for single and dual energy exposures when the detector is not perpendicular to energy emitted from the source.

7. A collimator assembly for an x-ray device, the collimator comprising:
   a first collimator blade positioned orthogonal to an x-ray source and having a first edge configured to define a first portion of a shape of x-rays emitted toward a detector; and
   a second collimator blade positioned orthogonal to the x-ray source and having a second edge configured to define a second portion of the shape of the x-rays emitted toward the detector;
   wherein the first collimator blade and the second collimator blade are separately positionable to alter an angle between the first edge and the second edge to eliminate a keystone effect in the detector that may be formed when the detector and x-ray source are re-positioned with respect to each other.

8. The collimator assembly of claim 7 wherein the first collimator blade and the second collimator blade are positioned having respective planes coplanar with one another.

9. The collimator assembly of claim 7 comprising:
   a first pivot joint coupled to a first end of the first collimator blade;
   a second pivot joint coupled to a second end of the first collimator blade;
   a third pivot joint coupled to a first end of the second collimator blade; and
   a fourth pivot joint coupled to a second end of the second collimator blade;
   wherein the first and second collimator blades are positionable about their respective pivot joints to form the trapezoidal shape.

10. The collimator assembly of claim 9 comprising:
    a first motor coupled to a first end of the first collimator plate and to a first end of the second collimator plate; and
    a second motor coupled to a second end of the first collimator plate and to a second end of the second collimator plate.

11. A computer readable storage medium embedded with a program configured to instruct a computer to operate a first motor coupled to an end of each of two collimator blades, to cause the two collimator blades to form an angle therebetween, such that a trapezoidal opening is formed between edges of the collimator blades, as viewed from an x-ray source, through which x-rays pass toward a detector.

12. The computer readable storage medium of claim 11 wherein the program is configured to instruct the computer to operate a second motor, coupled to another end of each of two collimator blades, to cause the two collimator blades to form the angle therebetween, such that the blades form the trapezoidal opening through which x-rays pass toward the detector.

13. The computer readable storage medium of claim 12 wherein the program is configured to instruct the computer to cause the first motor to operate at a first speed, and wherein the program is configured to instruct the computer to cause the second motor to operate at a second speed that is different from the first speed.

14. The computer readable storage medium of claim 12 wherein the program is configured to instruct the computer to cause the first motor to move the end of each of the two collimators a first distance, and to cause the second motor to move the another end of each of the two collimators a second distance that is different from the first distance.

15. A method of collimating x-rays for an x-ray device, the method comprising:
    tilting a first plate and a second plate with respect to each other to form a trapezoidal opening between the first and second plates, wherein a first surface of the first plate and a second surface of the second plate are positioned orthogonal to x-rays passing from an x-ray source to a detector; and
    emitting the x-rays from the x-ray source through the trapezoidal opening and toward the detector;
    wherein the detector is positioned to receive the x-rays at an angle that is not orthogonal to the x-rays.

16. The method of claim 15 wherein the first surface of the first plate is coplanar with the second surface of the second plate.

17. The method of claim 15 wherein tilting comprises tilting the first plate about a pivot joint that is coupled to the first plate.

18. The method of claim 15 wherein tilting the first plate comprises driving a motor to tilt the first plate.

19. An apparatus comprising:
    an x-ray source; and
    a collimator having two plates positionable to shape a beam of x-rays emitting from the x-ray source and through the collimator such that opposite sides of the beam of x-rays are non-parallel.

20. The apparatus of claim 19 comprising at least one gear coupled to the two plates, the gear configured to adjust an angle between the two non-parallel sides of the two plates.

21. The apparatus of claim 20 comprising a motor coupled to the gear and causing the gear to position the two plates to form the two non-parallel sides of the trapezoid.

* * * * *

UNITED STATES PATENT AND TRADEMARK OFFICE
CERTIFICATE OF CORRECTION

PATENT NO. : 7,714,293 B2 Page 1 of 1
APPLICATION NO. : 11/620667
DATED : May 11, 2010
INVENTOR(S) : Johnston et al.

It is certified that error appears in the above-identified patent and that said Letters Patent is hereby corrected as shown below:

Col. 4, line 53 (Claim 4), delete "claim 1" and
substitute therefore -- claim 3 --.

Signed and Sealed this

Sixth Day of July, 2010

David J. Kappos
*Director of the United States Patent and Trademark Office*